US009507355B2

(12) United States Patent
Keller

(10) Patent No.: US 9,507,355 B2
(45) Date of Patent: Nov. 29, 2016

(54) ADDRESSING METHOD FOR A LIGHTING MEANS

(75) Inventor: Ueli Keller, Ennenda (CH)

(73) Assignee: TRIDONIC GMBH & CO KG, Dornbirn (AT)

( * ) Notice: Subject to any disclaimer, the term of this patent is extended or adjusted under 35 U.S.C. 154(b) by 560 days.

(21) Appl. No.: 14/112,880

(22) PCT Filed: Apr. 20, 2012

(86) PCT No.: PCT/AT2012/000108
§ 371 (c)(1),
(2), (4) Date: Dec. 30, 2013

(87) PCT Pub. No.: WO2012/142637
PCT Pub. Date: Oct. 26, 2012

(65) Prior Publication Data
US 2014/0142731 A1 May 22, 2014

(30) Foreign Application Priority Data

Apr. 20, 2011 (AT) .................. 232/2011 U

(51) Int. Cl.
*G05D 25/02* (2006.01)
*H05B 37/02* (2006.01)
*H05B 33/08* (2006.01)

(52) U.S. Cl.
CPC .......... *G05D 25/02* (2013.01); *H05B 33/0884* (2013.01); *H05B 37/0254* (2013.01)

(58) Field of Classification Search
CPC ...... H04Q 9/14; H04Q 9/00; H04Q 11/0428; H04Q 2213/13097; H04Q 2213/13103; H04Q 2213/13106
USPC ........................................ 340/9.11
See application file for complete search history.

(56) References Cited

U.S. PATENT DOCUMENTS

| 6,404,143 | B1 | 6/2002 | Pilz et al. | |
| 7,548,150 | B2 * | 6/2009 | Huber | H05B 37/0254 315/224 |
| 7,571,063 | B2 * | 8/2009 | Howell | G01R 22/10 315/131 |
| 8,519,830 | B2 * | 8/2013 | Julio | H04Q 9/04 340/12.22 |
| 8,742,680 | B2 * | 6/2014 | Cowburn | H05B 37/0254 315/132 |
| 9,342,058 | B2 * | 5/2016 | Koski | G05B 11/01 |
| 2004/0217718 | A1 * | 11/2004 | Kumar | H05B 37/0272 315/291 |
| 2006/0125426 | A1 | 6/2006 | Veskovic et al. | |

FOREIGN PATENT DOCUMENTS

| DE | 19616067 A1 | 10/1997 |
| DE | 10147512 A1 | 4/2003 |
| DE | 10329682 A1 | 1/2005 |
| DE | 102008061089 A1 | 6/2010 |
| EP | 0489346 A2 | 6/1992 |

(Continued)

*Primary Examiner* — Mark Blouin
(74) *Attorney, Agent, or Firm* — Volpe and Koenig, P.C.

(57) ABSTRACT

The invention relates to an LED illumination system (BA), with at least one lighting means, the lighting means being controlled by at least one operating device (1, 1', 1" . . . ) according to commands of a central control unit (12), the operating devices (1, 1', 1" . . . ) being supplied with a voltage by the central control unit (12), and the operating devices (1, 1', 1" . . . ) having an address (A), the address (A) to be assigned to the operating device (1, 1', 1" . . . ) is associated on the basis of a temporally defined load behavior of the operating device (1, 1', 1" . . . ).

10 Claims, 4 Drawing Sheets

(56) References Cited

FOREIGN PATENT DOCUMENTS

| EP | 1035755 | A2 | 9/2000 |
| EP | 1659832 | A2 | 5/2006 |
| EP | 2264947 | A2 | 12/2010 |
| WO | 2009121622 | A2 | 10/2009 |
| WO | 2010057241 | A1 | 5/2010 |
| WO | 2010066678 | A1 | 6/2010 |

* cited by examiner

ADDRESSING METHOD FOR A LIGHTING MEANS

FIELD OF THE INVENTION

The invention relates to an addressing method for a lighting means and to a lighting system comprising at least one lighting means.

Such methods are used for driving operating devices for lighting means and are used in lighting systems in order, with the aid of a central control unit, to switch lighting means on and off and to set the brightness thereof. In this case, the lighting means are usually driven by operating devices. The operating devices are combined in groups and can be controlled by one or else a plurality of central control units. The term lighting means denotes both gas discharge lamps and halogen lamps or light emitting diodes (LED). Such a lighting means can be arranged individually or together with further lighting means in a luminaire which can also contain the operating device.

BACKGROUND

In accordance with the prior art, operating devices are addressed by the connection between lighting means and operating device being interrupted. This interruption is identified by the operating device and this operating device adopts the address that is currently to be allocated by the central control unit. This type of addressing requires a great expenditure with regards to time and labor since each individual lighting means has to be disconnected during installation in the entire lighting system.

Although methods for automatic address allocation already exist, for example an address can be allocated by random number, too many instances of double addressing can occur and thus require a great time expenditure in the case of large lighting systems. Avoiding these instances of double addressing requires a great time expenditure and computational complexity according to the known prior art.

SUMMARY

The object of the invention is achieved according to the invention for an apparatus of the generic type by the features of claim 1 and is achieved according to the invention for a method by the features of claim 5. Particularly advantageous embodiments of the invention are described in the dependent claims.

In this way, it is possible to provide an addressing method for a lighting means which can be carried out in a simple and rapid manner.

BRIEF DESCRIPTION OF THE PREFERRED EMBODIMENTS

The invention will be explained in greater detail below with reference to the accompanying drawing, in which.

DETAILED DESCRIPTION OF THE PREFERRED EMBODIMENTS

Figure 1:
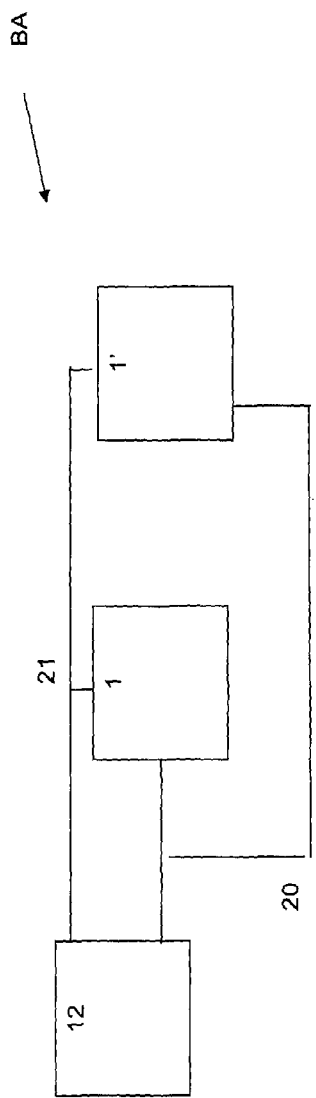
FIG. 1 shows a configuration of an LED lighting system

The invention is explained below on the basis of an exemplary embodiment of an LED lighting system.

The invention is explained below on the basis of an exemplary embodiment of an LED lighting system BA comprising a central control unit 12 and the operating devices 1, 1', 1", $1^{tx}$, $1^{ty}$.

The present invention can be used in all types of operating devices for lighting means. In this case, it is possible to employ very different lighting means; in particular, inorganic or organic light emitting diodes can be used.

The operating devices 1, 1', 1", $1^{tx}$, $1^{ty}$ and the central control unit 12 are part of an LED lighting system BA.

The illustration does not show the internal ground line present as a connection between all the operating devices 1, 1', 1", $1^{tx}$, $1^{ty}$ and the central control unit 12. The bus line 21 is preferably embodied as a two-wire combined low-voltage supply and data line which transmits a digital signal having a low DC voltage, for example 12 V, as control command.

By way of example, data transmission according to the DALI standard can also be effected via the bus line 21.

It should be noted that the data transmission of the control commands via the bus line 21 need not be effected in a wired manner, rather it can be transmitted for example in a wireless manner via a radio link or via a power line communication (PLC) or a switching modulation via the supply system 20. For the transmission variants mentioned there exist in each case standardized transmission methods analogous to the DALI standard for wired data transmission, wherein a modified data transmission via the same bus line 21 can be effected in accordance with the method according to the invention.

The central control unit 12 can optionally control individual or a plurality of operating devices 1 of lighting means via a bus line 21, wherein it can receive and also emit digital control commands.

The central control unit 12 can drive and supply a plurality of mutually independent operating devices 1. The mutually independent operating devices 1 can be distinguished from one another by different addresses. The supply by the central control unit 12 can be effected for example by means of a stabilized DC voltage (e.g. 48V) via the supply system 20. Preferably, the central control unit 12 also has a potential isolation such as e.g. a transformer and preferably also an active power factor correction circuit. The central control unit 12 can be connected to a power supply system voltage (e.g. 230 V AC). The central control unit 12 is therefore not just a control unit which emits commands such as brightness values, for example, to the operating devices 1, rather the central control unit 12 also supplies the operating devices 1 by means of a supply voltage separate and different from the power supply system voltage, preferably by means of a stabilized DC voltage (e.g. 48V), via the supply system 20.

The bus line 21 can be embodied, as already mentioned, as a combined low-voltage supply and data line and perform both the function of a low-voltage supply for the operating devices 1 and 1', preferably the control circuits thereof, and the function of data transmission to the operating devices 1 and 1' and back.

In an alternative variant, the bus line 21 can provide the function of supplying the operating devices 1 and 1' including the provision of the energy for driving the lighting means and can at the same time serve for data transmission. This can be effected for example by means of a DC voltage of 48V, for example, which can in each case be subjected to polarity reversal or else onto which a signal can be modulated in order to transmit data. In such a case, the supply system 20 can also be used only for the function of the low-voltage supply both the operating devices 1 and 1'.

However, it may also be possible that there is only a bus line 21 present via which both data and the energy for supplying the operating devices 1 and 1' and the lighting means connected thereto are transmitted.

Furthermore, the central control unit 12 can also be configured and controlled via directly connected pushbuttons or switches; by a preferably digital interface to a control or programming unit; by a touchscreen; or other setting possibilities including directly by a user. By means of the direct control possibility such as a digital interface, for example, the user can also predetermine control commands such as brightness values, for example. In this case, the central control unit 12 can have a bus address allocated to it upon linking to a digital bus such as, for example, DALI or DMX via the digital interface.

Within the LED lighting system BA, the operating devices 1, 1', 1" . . . have an address A. The addresses A to be allocated to the operating devices 1, 1', 1" . . . are assigned on the basis of a temporally determined load behavior of the operating devices 1, 1', 1" . . . .

The operating devices 1, 1', 1" can be put into an addressing mode by a supply voltage being switched on by the central control unit 12 and the operating devices 1, 1', 1" can define their temporally determined load behavior on the basis of a random number. Such a random number can be generated within each operating device 1, 1', for example upon the initial start or when an addressing mode is identified.

The temporally determined load behavior of the operating devices 1, 1', 1" . . . can be effected by a change in the power consumption at an input of the operating device 1, 1, 1". This can be effected for example by the connected lighting means being switched on or off or by a change in the brightness of the lighting means or else by an additional load being switched on.

The operating devices 1, 1', 1" can poll the possible addresses A on the basis of the temporally determined load behavior of the operating devices 1, 1', 1" and check whether, for a specific address, more than one operating device 1, 1', 1" sends an acknowledgement as a result of its temporally determined load behavior. In particular, the operating devices 1, 1', 1" can identify on the basis of a monitoring of the voltage of the line loaded by the operating devices during the address allocation.

The line to be loaded can be, for example, the control line 21 or the supply line 20. Within the LED lighting system BA comprising at least one lighting means, the lighting means which are supplied and driven by at least one operating device 1, 1', 1", $1^{x}$, $1^{y}$ depending on commands of a central control unit 12 can have an address. The address A (also called short address A) to be allocated to the operating devices 1, 1', 1", $1^{x}$, $1^{y}$ can be assigned on the basis of the temporally determined load behavior of the operating devices (1, 1', 1" . . . ).

As early as upon delivery of the operating devices 1, 1', 1", $1^{x}$, $1^{y}$, a preset address L may in each case be stored in the operating devices 1, 1', 1", $1^{x}$, $1^{y}$. However, this preset address L (also called long address L) may have been allocated for a plurality of operating devices 1, 1', 1", $1^{x}$, $1^{y}$ or be unsuitable for the communication on the bus line 21. For disturbance-free and user-friendly driving of the LED lighting system BA it is necessary for each operating device 1, 1, 1', 1", $1^{x}$, $1^{y}$ or each lighting means to have a unique address allocated only once.

The possible sequence of addressing will be described with reference to FIGS. 2 to 4.

The invention proposes an addressing method for an LED lighting system, wherein LEDs as lighting means are driven by at least one operating device 1, 1', 1" depending on commands of a central control unit 12 and the operating device 1, 1', 1" are supplied with a supply voltage by the central control unit 12, characterized by the following steps:

supplying the operating devices 1, 1', 1" with voltage by means of the central control unit 12, loading the central control unit 12 by switching on the operating devices 1, 1', 1", switching off the operating devices 1, 1', 1" in a delayed manner, wherein each operating device 1, 1', 1" defines the delay time for switching off on the basis of a random number and the switching off is detected by the central control unit 12, assigning addresses A for the operating devices 1, 1', 1", wherein the allocation of the addresses A is dependent on the detected order in the course of switching off the operating devices 1, 1', 1".

Figure 2:
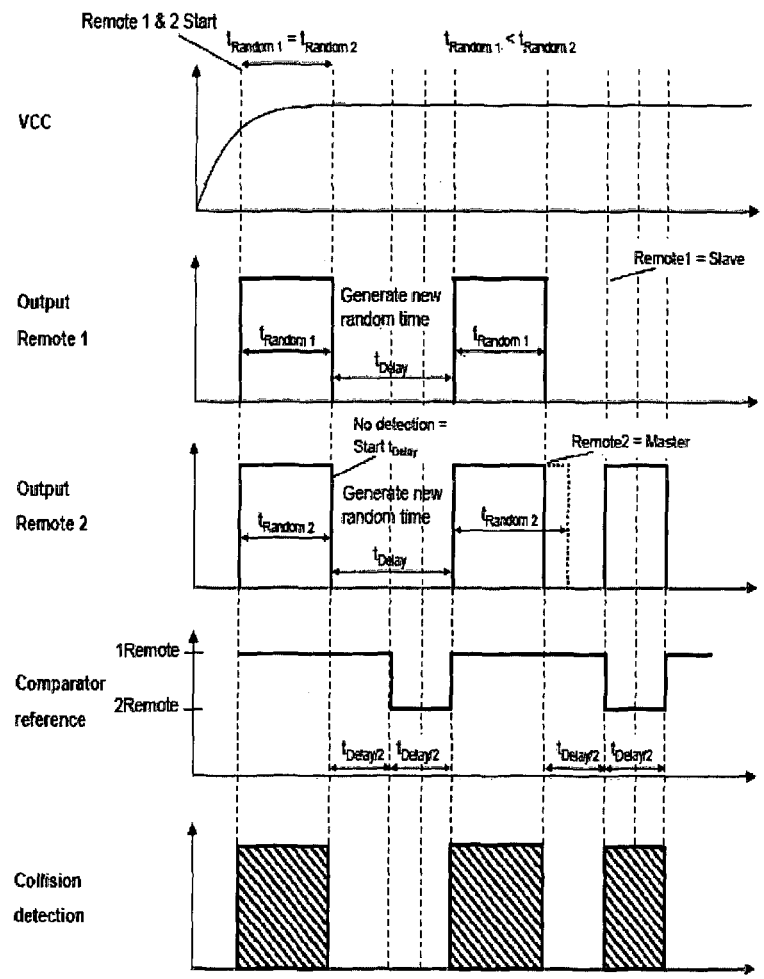
FIG. 2 shows a configuration of the sequence of addressing according to the invention

FIG. 2 shows a configuration of the sequence of address allocation according to the invention, wherein firstly an error (Collision) occurs. In the course of the first acknowledgement, a simultaneous acknowledgement by two operating devices is effected here.

The two operating devices identify on the basis of the monitoring of the voltage of the line loaded by the operating devices during the address allocation identify whether at the same time a further operating device also loads the line. In this example, the bus line 21 is fed with the voltage Vcc by the central control unit 12. The central control unit 12 switches the voltage Vcc and thus begins to supply the operating devices 1, 1' with the voltage Vcc. Since, in this example, the same random number was determined for both operating devices 1, 1', the time period t_random and the start times Remote 1 Start and Remote 2 Start, which determine the temporal load behavior, also correspond for both operating devices. Therefore, both operating devices 1, 1' load the bus line 21 for the same period of time. Since, by means of their monitoring, both operating devices 1, 1' identify the fact that no temporal loading deviating from their loading time has taken place and a collision (Collision Detection) has thus taken place in the course of the acknowledgement for addressing, after waiting during a waiting time t_delay they determine a new random number and thereupon load the bus line 21 once again depending on their random number with a delay time for the switching off.

Since the operating device 1' is then the first to identify that during its active loading (Output Remote 2) a further operating device 1 has already terminated its active loading (Output Remote 1), it allocates to itself an address A and the status of a master. After waiting during half a waiting time t_delay/2, the operating device 1' again loads the bus line 21. The further operating device 1 identifies the further loading of the bus line 21 by a further operating device and allocates to itself an address A' and the status of a slave.

Figure 3:
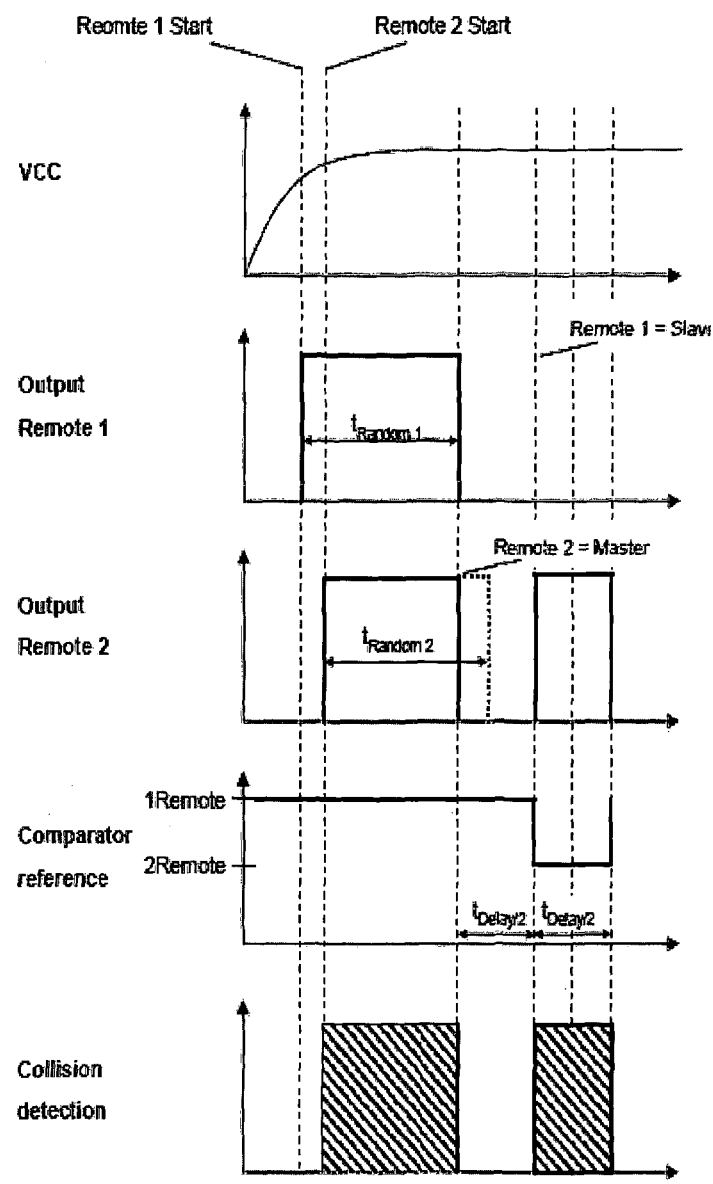
FIG. 3 shows a configuration of the sequence of addressing according to the invention and FIG. 4 shows part of a configuration of an LED lighting system.

FIG. 3 shows a configuration of the sequence of address assignment according to the invention, wherein simultaneous acknowledgement by two operating devices does not take place here.

The central control unit 12 switches the voltage Vcc and thus begins to supply the operating devices 1, 1' with the voltage Vcc. Since, in this example, a different random number was determined for both operating devices 1, 1', the time periods t_random and the start time Remote 1 Start and Remote 2 Start, which determine the temporal load behavior, also correspond for both operating devices. Therefore, both operating devices 1, 1' load the bus line 21 for a different period of time. Since the operating device 1' is then the first to identify that during its active loading (Output Remote 2) a further operating device 1 has already terminated its active loading (Output Remote 1), it allocates to itself an address A and the status of a master. After waiting during half a waiting time t_delay/2, the operating device 1' again loads the bus line 21. The further operating device 1 identifies the further loading of the bus line 21 by a further operating device and allocates to itself an address A' and the status of a slave. This method can thus be used for identifying address conflicts.

The checking operation can also be carried out repeatedly for remaining addresses A according to the same method.

In a further step, the central control unit 12 will poll the possible addresses A, A' and will also poll which operating device has been assigned the status as master.

Figure 4:
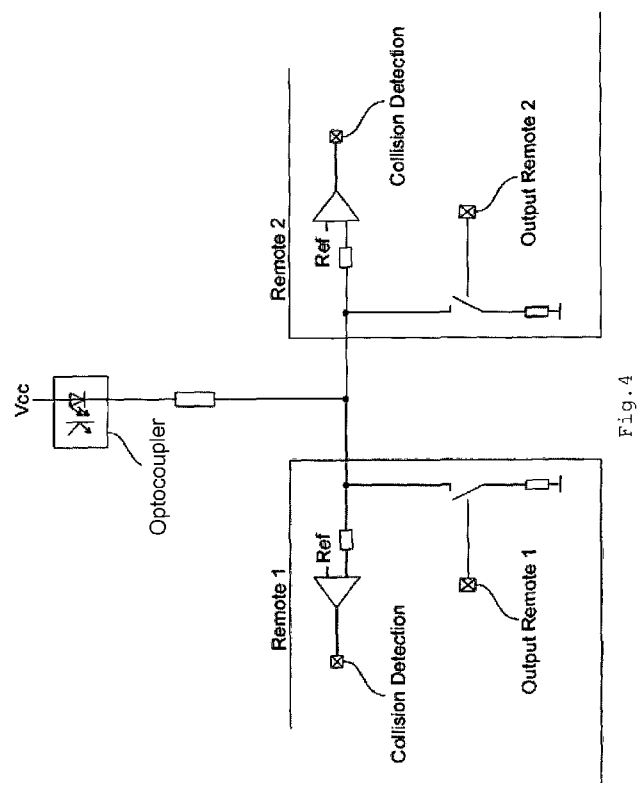

FIG. 4 shows a configuration of the construction of a load circuit of an operating device 1 and of a further operating device 1' and their respective one possible monitoring circuit for avoiding address conflicts (designated by collision detection).

In this example, both operating devices 1 and 1' are connected to the bus line 21 onto which the voltage Vcc is switched.

Both operating devices 1 and 1' each have a loading and monitoring circuit. Said loading and monitoring circuit firstly contains in each case a comparator which serves for monitoring the loading, and a controllable switch, via which a loading can be effected and which is connected to a resistor as load that can be switched on. The comparator serving for monitoring the loading can be fed a reference voltage in each case besides the voltage present on the bus line 21 to be monitored. The two reference voltages for the two operating devices 1 and 1' preferably differ, as is also indicated in FIGS. 2 and 3 on the basis of the comparator references (comparator reference) 1Remote and 2Remote. The output of the comparator can be monitored in each case, for example by an input of a microcontroller present in the operating device, which microcontroller can also have an output, Output Remote, for generating the random number and also for driving the controllable switch.

However, this embodiment is only one possibility; as already mentioned, it is also possible, for example, to switch the lighting means as load.

Furthermore, the central control unit 12 can also poll and check the possible addresses A until, for all possible addresses, not more than one operating device 1, 1', 1", 1$^{ix}$, 1$^{iy}$ sends an acknowledgement.

In a further step, the central control unit 12 can evaluate the responses and check for transmission errors. The central control unit 12 can poll the possible addresses A and check whether, for a specific address, more than one operating device 1, 1', 1", 1$^{ix}$, 1$^{iy}$ sends an acknowledgement.

The invention claimed is:

1. An LED lighting system (BA) with at least one lighting means, wherein the at least one lighting means is driven by at least one operating device (1, 1', 1" . . . ) depending on commands of a central control unit (12), the at least one operating device (1, 1', 1" . . . ) is supplied with a DC voltage by the central control unit (12) and the at least one operating device (1, 1', 1" . . . ) has an address (A), wherein the address (A) to be allocated to the at least one operating device (1, 1', 1" . . . ) is assigned on the basis of a temporally determined load behavior of the at least one operating device (1, 1', 1" . . . ).

2. The LED lighting system (BA) with at least one lighting means as claimed in claim 1, wherein the at least one operating device (1, 1', 1" . . . ) can be put into an addressing mode by a supply voltage being switched on by the central control unit (12) and the at least one operating device (1, 1', 1" . . . ) define their temporally determined load behavior on the basis of a random number.

3. The LED lighting system (BA) with at least one lighting means as claimed in claim 1, wherein the temporally determined load behavior of the at least one operating device (1, 1', 1" . . . ) is effected by a change in the power consumption at an input of the at least one operating device (1, 1', 1" . . . ).

4. The LED lighting system (BA) with at least one lighting means as claimed in claim 1, wherein the at least one operating device (1, 1', 1" . . . ) polls the possible addresses (A) on the basis of the temporally determined load behavior of the at least one operating device (1, 1', 1" . . . ) and checks whether, for a specific address, more than one operating device (1, 1', 1" . . . ) sends an acknowledgement as a result of its temporally determined load behavior.

5. An addressing method for an LED lighting system, wherein one or more LEDs as lighting means are driven by at least one operating device (1, 1', 1" . . . ) depending on commands of a central control unit (12) and the at least one operating device (1, 1', 1" . . . ) is supplied with a supply voltage by the central control unit (12), the method comprising:
supplying the at least one operating device (1, 1', 1" . . . ) with DC voltage by means of the central control unit (12),
loading the central control unit (12) by switching on the operating devices (1, 1', 1" . . . ),
switching off the at least one operating device (1, 1', 1" . . . ) in a delayed manner, wherein each operating device (1, 1', 1" . . . ) defines the delay time for switching off on the basis of a random number and the switching off is detected by the at least one operating device (1, 1', 1" . . . ),
assigning addresses (A) for the at least one operating device (1, 1', 1" . . . ), wherein allocation of the addresses (A) is dependent on a detected order in the course of switching off the at least one operating device (1, 1', 1" . . . ).

6. The addressing method for an LED lighting system as claimed in claim 5, wherein the central control unit (12) interrupts and restarts the supply of the at least one operating device (1, 1', 1" . . . ) if it is not possible to distinguish unambiguously between the individual instances of switching off the at least one operating device (1, 1', 1" . . . ).

7. The addressing method for an LED lighting system as claimed in claim 5, wherein a time period for the address allocation is defined for as long as is required for the possible number of addresses (A) in order to be able to assign an address (A) for all possible operating devices (1, 1', 1" . . . ).

8. The addressing method for an LED lighting system as claimed in any of claim 5, wherein the at least one operating device which was the first to be allocated an address (A) is allocated a status of a master.

9. The addressing method for an LED lighting system as claimed in claim 8, wherein further operating devices which were not the first to be allocated an address (A) are allocated a status of a slave.

10. The addressing method for an LED lighting system as claimed in claim 5, wherein the at least one operating device (1, 1', 1" . . . ) in the course of switching off carry out monitoring as to whether another operating device (1, 1',

1" . . . ) is also switched off at the same time and a collision is thus effected in the course of the acknowledgement for addressing.

* * * * *